United States Patent [19]

Ballard

[11] 4,198,718

[45] Apr. 22, 1980

[54] PORTABLE FOLDING BED

[76] Inventor: Clella N. Ballard, 708 Manor Dr., Milford, Mich. 48042

[21] Appl. No.: 930,724

[22] Filed: Aug. 3, 1978

[51] Int. Cl.$^2$ .................................... A47D 9/00

[52] U.S. Cl. .................................... 5/93 B; 5/99 R; 119/19; 312/244

[58] Field of Search ............ 119/1, 19; 5/93 R, 93 B, 5/94, 99 R; 312/244

[56] References Cited

U.S. PATENT DOCUMENTS

| | | | |
|---|---|---|---|
| 2,691,176 | 10/1954 | Saldana | 5/93 R |
| 3,125,663 | 3/1964 | Hoffman | 5/93 R |
| 3,722,009 | 3/1973 | Hrynda | 5/93 R |
| 4,097,942 | 7/1978 | Bridger | 5/93 B |

*Primary Examiner*—Casmir A. Nunberg

*Attorney, Agent, or Firm*—Hauke and Patalidis

[57] ABSTRACT

A portable bed for a small animal has an elongated center section of rectangular configuration. A rounded end section is hinged to each elongated side of the center section. Rigid sidewalls extending in the same direction perpendicularly from the short edges of the center section and rounded edges of the end sections define an enclosed area. The rounded end sections are dimensioned to give a nesting relationship between the sections when they are folded toward each other. The sides of the bed opposite the sidewalls may be equipped with resting knobs to maintain the bed a short distance from the floor when it is in use. A handle connected to the outer sidewall (when the bed is in folded position) enables the bed to be carried readily. A cushion substantially coextensive with the surface provided by the center and end sections completes the assembly.

5 Claims, 5 Drawing Figures

21 15 18 13 16 14 16 19 11 19 10 12 19

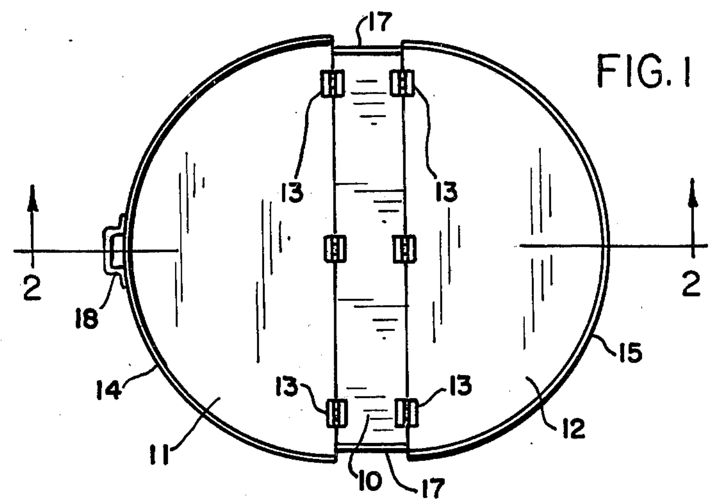
17
FIG. 1
13
13
2
2
18
15
14
13
13
11
12
10
17
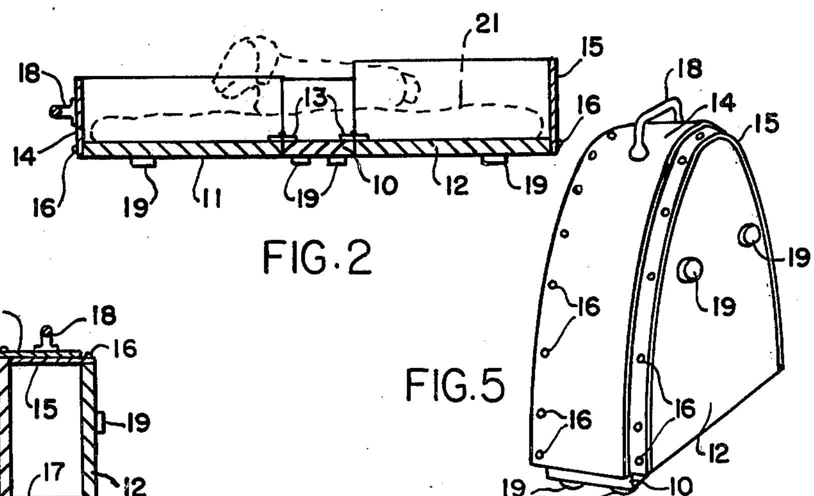
21
15
18
13
16
14
16
19
11
19
10
12
19
FIG. 2
18
14
15
19
19
16
FIG. 5
16
16
16
12
19
10
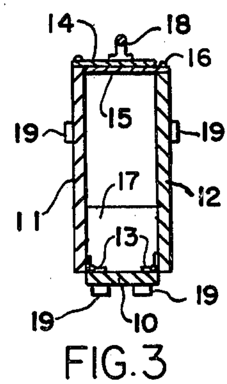
14
18
16
15
19
19
17
11
12
13
19
10
19
FIG. 3
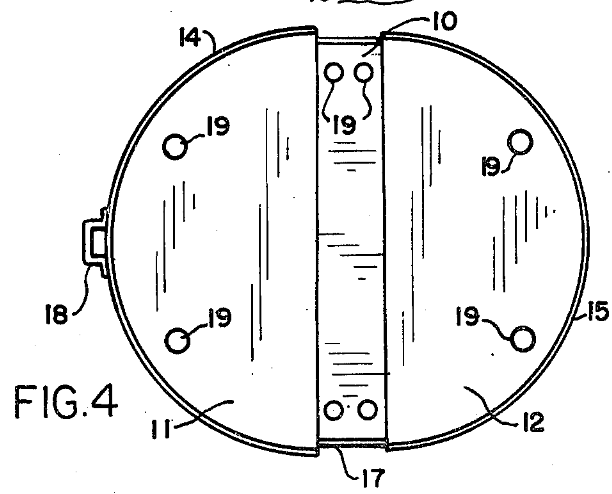
14
10
19
19
19
18
19
19
15
FIG. 4
11
12
17

PORTABLE FOLDING BED

BACKGROUND OF THE INVENTION

Portable folding beds for small animals such as dogs are an important accessory to owners who desire to take their pets with them on cross-country automobile trips. Many animals become attached to their home surroundings and are not very good travelers. However, when equipment which the animal is used to, such as a bed, is taken along on the trip the anxieties which the animal feels upon facing constantly changing environments are somewhat settled and the animal's behavior is much more dependable. A bed is typical of the equipment taken along to accommodate a pet.

While a bed taken along for the pet does not have to be a folding bed, space is usually somewhat limited and therefore a folding bed is desirable. An example of a dog bed which may be disassembled and packed into a small space is disclosed in Norton U.S. Pat. No. 2,238,982. Another dog bed suitable for use in traveling is disclosed in Kruck U.S. Pat. No. 2,775,222. A portable crib bed for a child which could also be used as a dog bed is disclosed in U.S. Pat. No. 2,486,067.

The present invention is directed to a bed, and particularly to a dog bed, which may be folded into a compact carrying size for convenient stowage while traveling.

SUMMARY OF THE INVENTION

The bed of the present invention consists of three basic support pieces composed of a rigid material such as plywood. A central rectangular section with elongated sides has each elongated side hinged to an end section which has rounded ends. While each of the end sections has the same rounded configuration, generally semi-circular in plan view, one is made with a slightly smaller radius than the other. Extending in an upward direction from the edges of the rounded end sections are rigid sidewalls which define the perimeter of the bed. When the bed is in folded position the sidewalls of the end section of smaller radius nests within the sidewalls of the end section of larger radius. The center section also has a sidewall extending upward from each of its narrow ends which may be arranged either for folding against the surface of the center section or may be made rigid and arranged for a nesting relationship with the sides of the end sections. The assembly is completed by a cushion, a carrying handle, and resting knobs.

BRIEF DESCRIPTION OF THE DRAWING

FIG. 1 of the drawing is a top plan view of a bed of this invention with the cushion omitted;

FIG. 2 is a view taken along the line 2—2 of FIG. 1 with a cushion indicated by dashed lines and a dog reposing thereon also indicated by dashed lines;

FIG. 3 is a sectional view similar to FIG. 2 showing the relationship of the elements when the bed is folded;

FIG. 4 is a bottom view of the bed showing the positioning of resting knobs; and FIG. 5 is a perspective view of the bed shown in folded position.

DESCRIPTION OF THE PREFERRED EMBODIMENT

The basic supporting structure of the bed of this invention consists of an elongated rectangular center section 10, a first rounded, end section 11, and a second rounded, end section 12, the end section 12 being of slightly smaller radius than the end section 11. The sections 10–12 are composed of a rigid material such as plywood of a thickness of about ⅜" or ½".

The end sections 11 and 12 are connected to the elongated edge of the center section 10 by a plurality of hinges 13. Each of the sets of three hinges 13 illustrated could be replaced by a single piano-type hinge or by a plastic hinge composed of material such as thin-section polypropylene.

Extending perpendicularly upward a short distance from the perimeter of the end section 11 is a rigid sidewall 14. Similarly extending a short distance upward from the perimeter of end section 12 is a rigid sidewall 15. The sidewalls 14 and 15 are connected to the edges of the end sections 11 and 12 by means of spaced screws or rivets 16 as best shown in FIG. 5. The sidewalls 14 and 15 may be composed of plastic material or of thin plywood. Sheet polymeric materials such as polypropylene sheet and polyethylene sheet are satisfactory for use as sidewalls 14 and 15. The same material as is used for the sidewalls 14 and 15 may be used for the sides 17 of the center section 10. The sidewalls 17 may be positioned to fold between, or inside of, the sidewalls 14 and 15 or may be hinged (hinges not shown) so as to be folded down against the surface of the center section 10 prior to folding the bed for carrying.

Since the radius of the end section 12 is somewhat smaller than the radius of the end section 11 when the bed is folded as illustrated in FIG. 3 the sidewall 15 is nested within the sidewall 14. A carrying handle 18 is therefore attached to the sidewall 14 in order to enable the bed to be carried easily. In order to minimize wear on the bed and to hold it slightly off of the floor a plurality of resting knobs 19 are attached to the bottom sides of the base pieces 10–12 as best illustrated in FIG. 4. The base section 10 has a resting knob 19 near each corner thereof and each of the end sections 11 and 12 has two resting knobs 19 symmetrically positioned to provide balanced support to the bed. As shown in dashed lines in FIG. 2, a cushion 21 completes the article of the invention.

Although the invention has been described with referenceto a particular embodiment, it is obvious that there may be variations which properly fall within the scope of the invention. Accordingly, the invention should be limited in scope only as may be necessitated by the scope of the appended claims.

I claim:

1. A pet portable folding bed comprising a flat center section of rectangular configuration defining elongated sides and narrow ends, a first rounded substantially semi-circular end section hinged to an elongated side of said center section, a second rounded substantially semi-circular end section hinged to the other elongated side of said center section, said second rounded end section having the same shape but having a slightly smaller area of slightly smaller circle radius than said first rounded end section, and rigid sidewalls extending perpendicularly in the same direction from the narrow ends of said center section and the edges of said end sections, said sidewalls defining an enclosed area and being positioned in nesting relationship when said end sections are folded toward each other with the sidewall of said second end section disposed substantially parallel and within the sidewall of said first end section.

2. A portable bed as claimed in claim 1 in which a carrying handle is mounted on the outer side of the rigid sidewall of said first end section.

3. A portable bed as claimed in claim 1 in which a plurality of resting knobs are mounted on the surfaces of said center section and end sections opposite the surfaces provided with said sidewalls.

4. A portable bed as claimed in claim 3 in which the center section has four resting knobs and each end section has two resting knobs.

5. A portable bed as claimed in claim 4 in which a cushion substantially coextensive with the area defined by the center section and end sections is positioned within the rigid sidewalls.

* * * * *

UNITED STATES PATENT AND TRADEMARK OFFICE

CERTIFICATE OF CORRECTION

PATENT NO. : 4,198,718

DATED : April 22, 1980

INVENTOR(S) : Clella N. Ballard

It is certified that error appears in the above-identified patent and that said Letters Patent are hereby corrected as shown below:

Col. 1, line 67, after "rounded," insert --or semi-circular,--.

line 68, after "rounded," insert --or semi-circular,--.

Col. 2, lines 44 and 45, correct the spelling of "reference to".

Signed and Sealed this

*Twenty-second* Day of *July 1980*

[SEAL]

*Attest:*

SIDNEY A. DIAMOND

*Attesting Officer* *Commissioner of Patents and Trademarks*